(12) United States Patent　　　(10) Patent No.:　　US 9,584,629 B2
Lerman　　　　　　　　　　　　　　(45) Date of Patent:　　Feb. 28, 2017

(54) SYSTEMS AND METHODS FOR MANAGING AND PUBLISHING MANAGED CONTENT

(71) Applicant: Say Media, Inc., San Francisco, CA (US)

(72) Inventor: David Ross Lerman, San Francisco, CA (US)

(73) Assignee: SAY Media, Inc., San Francisco, CA (US)

( * ) Notice: Subject to any disclaimer, the term of this patent is extended or adjusted under 35 U.S.C. 154(b) by 0 days.

(21) Appl. No.: 15/145,685

(22) Filed: May 3, 2016

(65) Prior Publication Data

US 2016/0344847 A1　Nov. 24, 2016

Related U.S. Application Data

(63) Continuation of application No. 13/793,738, filed on Mar. 11, 2013, now abandoned.

(51) Int. Cl.
　　*G06F 15/16*　　(2006.01)
　　*H04L 29/06*　　(2006.01)
　　(Continued)

(52) U.S. Cl.
　　CPC ............ *H04L 67/42* (2013.01); *G06F 17/301* (2013.01); *H04L 67/02* (2013.01); *H04L 67/10* (2013.01)

(58) Field of Classification Search
　　CPC .. G06F 17/30; G06F 17/30091; G06F 17/301; G06F 17/30522–17/30525
　　See application file for complete search history.

(56) References Cited

U.S. PATENT DOCUMENTS 5,848,396 A　12/1998　Gerace
5,935,004 A　8/1999　Tarr et al.
(Continued)

FOREIGN PATENT DOCUMENTS

WO　9741673　11/1997
WO　0038428　6/2000
(Continued)

OTHER PUBLICATIONS

"America Online as RealNetworks Expand Relationship to Enable Streamed Interactive Marketing Services Using Helix Universal Servers", Sep. 19, 2002, PR Newswire.
(Continued)

*Primary Examiner* — Brendan Higa
(74) *Attorney, Agent, or Firm* — KPPB LLP (57) ABSTRACT

Systems and methods for content management server systems configured to manage and publish managed content in accordance with embodiments of the invention are disclosed. In one embodiment, a versioned content management server system, includes a processor, a versioned content management application, managed content, wherein managed content includes content and content version metadata, wherein the versioned content management application configures the processor to receive updated content, locate managed content based on the received updated content, determine version data based on a portion of the located managed content, the received updated content, update the content version metadata data, associate the updated version content data with the managed content, receive a request for content, identify a portion of the managed content that corresponds to the requested content, retrieve the identified portion of the managed content, and transmit the retrieved portion of the managed content.

20 Claims, 6 Drawing Sheets

(51) Int. Cl.
*H04L 29/08* (2006.01)
*G06F 17/30* (2006.01)

(56) References Cited

U.S. PATENT DOCUMENTS

| | | | |
|---|---|---|---|
| 6,167,441 A | 12/2000 | Himmel | |
| 6,230,204 B1 | 5/2001 | Fleming | |
| 6,260,040 B1 | 7/2001 | Kauffman et al. | |
| 6,385,591 B1 | 5/2002 | Mankoff | |
| 6,553,178 B2 | 4/2003 | Abecassis | |
| 6,611,358 B1* | 8/2003 | Narayanaswamy | H04N 1/33307 358/442 |
| 6,690,481 B1 | 2/2004 | Yeung et al. | |
| 6,834,372 B1 | 12/2004 | Becker et al. | |
| 7,028,001 B1 | 4/2006 | Muthuswamy et al. | |
| 7,055,169 B2 | 5/2006 | Delpuch et al. | |
| 7,133,837 B1 | 11/2006 | Barnes, Jr. | |
| 7,188,085 B2 | 3/2007 | Pelletier | |
| 7,213,005 B2 | 5/2007 | Mourad et al. | |
| 7,386,473 B2 | 6/2008 | Blumenau | |
| 7,631,330 B1 | 12/2009 | Des Jardins | |
| 7,680,932 B2* | 3/2010 | Defaix | G06F 8/71 709/203 |
| 7,685,191 B1 | 3/2010 | Zwicky et al. | |
| 7,694,271 B2 | 4/2010 | Becker et al. | |
| 7,702,318 B2 | 4/2010 | Ramer et al. | |
| 7,734,503 B2 | 6/2010 | Agarwal et al. | |
| 7,840,911 B2 | 11/2010 | Milener et al. | |
| 7,930,206 B2 | 4/2011 | Koningstein | |
| 7,954,064 B2 | 5/2011 | Forstall et al. | |
| 8,306,859 B2 | 11/2012 | Lerman et al. | |
| 8,386,317 B2 | 2/2013 | Brown et al. | |
| 8,401,903 B2 | 3/2013 | Lerman et al. | |
| 8,494,907 B2 | 7/2013 | Lerman et al. | |
| 8,819,116 B1* | 8/2014 | Tomay | H04N 21/254 709/203 |
| 2001/0052000 A1 | 12/2001 | Giacalone, Jr. | |
| 2002/0067730 A1 | 6/2002 | Hinderks et al. | |
| 2002/0077900 A1 | 6/2002 | Thompson et al. | |
| 2002/0078456 A1 | 6/2002 | Hudson et al. | |
| 2002/0113813 A1 | 8/2002 | Yoshimine | |
| 2003/0101230 A1 | 5/2003 | Benschoter et al. | |
| 2003/0117433 A1 | 6/2003 | Milton et al. | |
| 2003/0120541 A1 | 6/2003 | Siann et al. | |
| 2004/0010806 A1 | 1/2004 | Yuen et al. | |
| 2004/0015398 A1 | 1/2004 | Hayward | |
| 2004/0093327 A1 | 5/2004 | Anderson et al. | |
| 2005/0015461 A1* | 1/2005 | Richard | G06F 17/30194 709/217 |
| 2005/0038900 A1 | 2/2005 | Krassner et al. | |
| 2005/0096979 A1 | 5/2005 | Koningstein | |
| 2005/0096980 A1 | 5/2005 | Koningstein | |
| 2005/0137958 A1 | 6/2005 | Huber et al. | |
| 2005/0138656 A1 | 6/2005 | Moore et al. | |
| 2005/0216342 A1 | 9/2005 | Ashbaugh | |
| 2005/0216936 A1 | 9/2005 | Knudson et al. | |
| 2005/0267813 A1 | 12/2005 | Monday | |
| 2005/0275626 A1 | 12/2005 | Mueller et al. | |
| 2006/0173974 A1 | 8/2006 | Tang | |
| 2006/0173985 A1 | 8/2006 | Moore | |
| 2006/0253584 A1 | 11/2006 | Dixon | |
| 2007/0043617 A1 | 2/2007 | Stein et al. | |
| 2007/0124756 A1 | 5/2007 | Covell et al. | |
| 2007/0276729 A1 | 11/2007 | Freer | |
| 2007/0300152 A1 | 12/2007 | Baugher | |
| 2008/0183568 A1 | 7/2008 | Ida et al. | |
| 2008/0244038 A1 | 10/2008 | Martinez | |
| 2008/0276269 A1 | 11/2008 | Miller et al. | |
| 2008/0276272 A1 | 11/2008 | Rajaraman et al. | |
| 2009/0326966 A1 | 12/2009 | Callaghan et al. | |
| 2010/0049699 A1 | 2/2010 | Benschoter et al. | |
| 2010/0134828 A1* | 6/2010 | Nishiyama | H04N 1/00214 358/1.15 |
| 2011/0202535 A1* | 8/2011 | Deolalikar | G06F 17/30705 707/739 |
| 2011/0231265 A1 | 9/2011 | Brown et al. | |
| 2011/0282933 A1* | 11/2011 | Schmier | G06F 17/30905 709/203 |
| 2013/0054559 A1 | 2/2013 | Pettit | |
| 2013/0073402 A1 | 3/2013 | Lerman et al. | |
| 2013/0117129 A1 | 5/2013 | Brown et al. | |
| 2013/0291012 A1 | 10/2013 | Lerman et al. | |
| 2014/0136347 A1 | 5/2014 | Lerman et al. | |
| 2014/0244407 A1 | 8/2014 | Brown et al. | |
| 2014/0245125 A1 | 8/2014 | Ozgul | |
| 2014/0258373 A1 | 9/2014 | Lerman | |
| 2014/0258847 A1 | 9/2014 | Cleave | |
| 2016/0217494 A1 | 7/2016 | Veselov et al. | |

FOREIGN PATENT DOCUMENTS

| | | |
|---|---|---|
| WO | 0203706 A1 | 1/2002 |
| WO | 2014133627 A1 | 9/2014 |

OTHER PUBLICATIONS

"Advertisers Must Use Interactive Tools Wth Care", Business Wire, Ovum Report Warns: Mobile Internet Not Just Another Channel For High-Volume Push., Jun. 5, 2000, 4 pgs.

"Juno Gets Two More Patents Covering Offline Email", CBR Staff Writer; printed Jun. 11, 2012 from http://www.cbronline.com/news/juno_gets_two_more_patents_covering_offline_email, 2 pgs., Dec. 14, 1998.

"Lenel Systems International, Inc. Press Release", Newswire, Mar. 12, 1996, 4 pgs.

"Think About That for a Minute", Anonymous, Cablefax. v12n51, Mar. 15, 2001, 1 pg.

Forbes, David C., "The digital press", Mammoth Micro Productions, Churbuck, v152 , n7, Sep. 27, 1993., p. 136(2).

Shaw, "The interactive living revolution (Interactive Living) (interactive television still shows potential)", Russell Broadcasting & Cable, Mar. 31, 2003, vol. 133, No. 13, p. 3A(8).

* cited by examiner

SYSTEMS AND METHODS FOR MANAGING AND PUBLISHING MANAGED CONTENT

CROSS REFERENCE TO RELATED APPLICATIONS

The current application is a continuation application of U.S. patent application Ser. No. 13/793,738, filed Mar. 11, 2013, the disclosure of which is incorporated herein by reference in its entirety.

FIELD OF THE INVENTION

The present invention relates to systems and methods for managing and publishing content and more specifically to managing and publishing managed content.

BACKGROUND

A content management system is a system configured to enable the management and publishing of content stored using the content management system. Content management systems organize and store a variety of content, such as documents, image data, video data, and audio data utilizing a back-end storage system. Content management systems also provide functionality to centralize the publishing of those documents, such as via one or more web sites. By providing centralized functionality for the publishing of documents, a content management system provides a convenient way to host and manage a variety of web sites from a single back-end storage system.

The Internet is a global system of interconnected computer networks. Varieties of services are provided on the Internet, including websites. Websites include a variety of content, such as text, pictures, audio data, video data, and other interactive content. Web sites are typically hosted using content servers and a web browser is an application that enables a user to receive, view, and interact with a websites hosted on content servers. A variety of web browsers are commonly used to view websites, including Internet Explorer from Microsoft Corporation of Redmond, Wash. and the Chrome browser from Google, Inc. of Mountain View, Calif.

Many documents, including web pages within a website, are written using the Hypertext Markup Language (HTML). A HTML document contains a set of nested tags. HTML tags include data stored in the tag, either as a property of the tag or between an opening tag and a closing tag. Web browsers do not display the HTML tags; rather, web browsers are configured to parse a HTML document and render one or more web pages including the information stored in the HTML tags. Cascading Style Sheets (CSS) are used to describe the formatting and display of a document when it is rendered. CSS can be used to describe the formatting of a variety of documents, including HTML documents and other documents, such as documents written using the Extensible Markup Language (XML). A single document can have a variety of associated CSS, so that the document can be rendered in a variety of ways depending on the capabilities of the device used to display the document. For example, a HTML document can be rendered with one format in a web browser on a desktop computer using a CSS designed for a desktop browser, while the same HTML document can be rendered in a second format in a web browser running on a mobile phone using a second CSS designed for a mobile browser.

Many web pages utilize scripts in order to provide flexibility in the creation and display of a web page. Scripts can be written in a variety of languages, including JavaScript by the Mozilla Foundation of Mountain View, Calif. and ECMAScript, standardized as ECMA-262 by ECMA International of Geneva, Switzerland. Web browsers are configured to parse and execute scripts contained in web pages. These scripts can control the appearance of a web page, customize the content according to the preferences of a user viewing the web page, and allow for data to be received using the web page. Scripts can be server-side, where the script is run on a content server, or client-side, where the script is run using the web browser receiving the script.

SUMMARY OF THE INVENTION

Systems and methods for content management server systems configured to manage and publish managed content in accordance with embodiments of the invention are disclosed. In one embodiment, a versioned content management server system, includes a processor, a memory connected to the processor and configured to store a versioned content management application, and content storage configured to store managed content, wherein managed content includes content and content version metadata associated with the content and wherein the versioned content management application configures the processor to receive updated content, where the updated content is associated with author data, locate managed content stored in the content storage device based on the received updated content, determine version data based on a portion of the located managed content, the received updated content, and the author data, update the content version metadata data based on the updated content and the version data, associate the updated version content data with the managed content, receive a request for content, where the request for content includes a requested content version and requesting device capabilities, identify a portion of the managed content that corresponds to the requested content version and requesting device capabilities, retrieve the identified portion of the managed content, and transmit the retrieved portion of the managed content.

In another embodiment of the invention, the versioned content management application further configures the processor to transmit the retrieved portion of the managed content to a content display device, where the content display device is configured to display the transmitted content.

In an additional embodiment of the invention, the content display device is configured to determine performance data based on the received content and transmit the determined performance data to the versioned content management server system.

In yet another additional embodiment of the invention, the versioned content management application further configures the processor to receive performance data related to the identified portion of the managed content and include the performance data with the content version metadata associated with the identified portion of the managed content.

In still another additional embodiment of the invention, the versioned content metadata includes performance data related to interactions with the portion of the managed content associated with the versioned content metadata.

In yet still another additional embodiment of the invention, the versioned content management application further configures the processor to identify the portion of the managed content corresponding to the requested content based on the performance data.

In yet another embodiment of the invention, the managed content includes a first portion of content and a second portion of content, where the first portion of content and the second portion of content are related via a hierarchical relationship and wherein the versioned content management application further configures the processor to identify changes between the obtained content, the first portion of content, and the second portion of content, generate content version metadata using the identified changes, and generate the obtained content using the content version metadata and the first portion of content.

In still another embodiment of the invention, the versioned content management application further configures the processor to obtain unmanaged content, incorporate the unmanaged content into the retrieved portion of the managed content to create merged content, and transmit the merged content.

In yet still another embodiment of the invention, the versioned content management application further configures the processor to transmit the retrieved portion of the managed content to a content delivery server system, where the content delivery server system is configured to receive content from at least one versioned content management server system, receive delivery requests for content, and transmit content in response to the received delivery requests.

In still another additional embodiment of the invention, the content delivery server system is configured to identify one or more references to unmanaged content in the received content, request unmanaged content based on the references to unmanaged content, receive unmanaged content from at least one unmanaged content source, and update the content to incorporate the referenced unmanaged content.

Yet another embodiment of the invention includes a method for managing versioned content including receiving updated content using a versioned content management server system, where the updated content is associated with author data, locating managed content stored in the versioned content management server system based on the received updated content using the versioned content management server system, determining version data based on a portion of the located managed content, the received updated content, and the author data using the versioned content management server system, updating the content version metadata data based on the updated content and the version data using the versioned content management server system, associating the updated version content data with the managed content using the versioned content management server system, receiving a request for content using the versioned content management server system, where the request for content includes a requested content version and requesting device capabilities, identifying a portion of the managed content that corresponds to the requested content version and requesting device capabilities using the versioned content management server system, retrieving the identified portion of the managed content using the versioned content management server system, and transmitting the retrieved portion of the managed content using the versioned content management server system.

In yet another additional embodiment of the invention, managing versioned content further includes transmitting the retrieved portion of the managed content to a content display device using the versioned content management server system, where the content display device is configured to display the transmitted content In still another additional embodiment of the invention, the content display device is configured to determine performance data based on the received content and transmit the determined performance data to the versioned content management server system.

In yet still another additional embodiment of the invention, managing versioned content further includes receiving performance data related to the identified portion of the managed content using the versioned content management server system and including the performance data with the content version metadata associated with the identified portion of the managed content using the versioned content management server system.

In yet another embodiment of the invention, the versioned content metadata includes performance data related to interactions with the portion of the managed content associated with the versioned content metadata.

In still another embodiment of the invention, managing versioned content further includes identifying the portion of the managed content corresponding to the requested content based on the performance data using the versioned content management server system.

In yet still another embodiment of the invention, managing versioned content further includes identifying changes between the obtained content, a first portion of content, and a second portion of content using the versioned content management server system, where the managed content includes the first portion of content and the second portion of content, where the first portion of content and the second portion of content are related via a hierarchical relationship, generating content version metadata based on the identified changes using the versioned content management server system, and generating the obtained content based on the content version metadata and the first portion of content using the versioned content management server system.

In yet another additional embodiment of the invention, managing versioned content further includes obtaining unmanaged content using the versioned content management server system, incorporating the unmanaged content into the retrieved portion of the managed content to create merged content using the versioned content management server system, and transmitting the merged content using the versioned content management server system.

In still another additional embodiment of the invention, managing versioned content further includes transmitting the retrieved portion of the managed content to a content delivery server system using the versioned content management server system, where the content delivery server system is configured to receive content from at least one versioned content management server system, receive delivery requests for content, and transmit content in response to the received delivery requests.

In yet still another additional embodiment of the invention, the content delivery server system is configured to identify one or more references to unmanaged content in the received content, request unmanaged content based on the references to unmanaged content, receive unmanaged content from at least one unmanaged content source, and update the content to incorporate the referenced unmanaged content.

DETAILED DESCRIPTION

Turning now to the drawings, systems and methods for managing and publishing managed content in accordance with embodiments of the invention are illustrated. Versioned content management server systems in accordance with embodiments of the invention are configured to receive, store, and transmit managed content. In a variety of embodiments, managed content includes content data and a set of versioning data, where a subset of the versioning data can be combined with the content data to create a version of the managed content. In a number of embodiments, versioning data is stored using content version metadata associated with the managed content. In many embodiments, one or more versions of managed content can refer to pieces of unmanaged content (i.e. content located on remote servers and/or content that does not include versioning data that can be utilized to generate alternative versions of the content). The unmanaged content can be stored using the versioned content management server system and/or an external unmanaged content source.

Versioned content management server systems in accordance with many embodiments of the invention can receive modified versions of managed content and track the differences between currently stored managed content and the received modified content. The tracked differences can be included in the versioning data for the managed content. In this way, versioned content management server systems can simultaneously store a number of versions of the managed content and transmit an appropriate version of the managed content in response to a request for (a particular version of) the managed content. In a variety of embodiments, versioned content management server systems include content version decision data associated with one or more pieces of managed content describing one or more conditions associated with providing versions of the managed content in response to a content request. Content requests can be received from a variety of devices, including content delivery server systems and content display devices; other devices can request content from and/or provide content to versioned content management server systems as appropriate to the requirements of specific applications in accordance with embodiments of the invention.

Content display devices and content delivery server systems in accordance with embodiments of the invention are configured to request one or more pieces of managed content from a versioned content management server system and/or from a content delivery server system. Content delivery server systems are configured to request one or more versions of managed content from a versioned content management server system and/or an unmanaged content source, store the requested content, and deliver the stored content in response to requests for the stored content from content display devices. Content display devices include devices running web browsers configured to display hypertext markup language (HTML) web pages using cascading style sheets (CSS) and one or more scripts. In a number of embodiments, the CSS are used to define the HTML defining the web page and the CSS are utilized to define and style the content and/or the activity zones. These scripts can be contained in one or more files included in the web page and/or included inline in the web page. The scripts can be written in any scripting language known to one of ordinary skill in the art including, but not limited to, JavaScript and ECMAScript. In many embodiments, the content transmitted in response to a request from a content display device and/or a content delivery server system by a versioned content management server system is customized based on a number of factors, including the time the content is requested by the device, the location of the device, content previously provided to the requesting device and/or other devices, and the capabilities of the requesting device. Other factors can be utilized to customize the managed content transmitted by a versioned content management server system as appropriate to the requirements of specific applications in accordance with embodiments of the invention.

Although versioned content management server systems configured to store and transmit managed content are described above with respect to managed content including HTML, CSS, and one or more scripts, any variety of content, including image data, audio data, video data, and text data, can be managed and transmitted by versioned content management server systems as appropriate to the requirements of specific applications in accordance with embodiments of the invention. Systems and methods for content delivery systems including versioned content management server systems in accordance with embodiments of the invention are described below.

Content Delivery System Overview

Content delivery systems in accordance with embodiments of the invention are configured to receive and manage content using versioned content management server systems and provide one or more versions of the managed content to content display devices and/or content delivery server systems. A content delivery system in accordance with an embodiment of the invention is conceptually illustrated in FIG. 1. The content delivery system 100 includes a content delivery server system 110 connected to one or more content display devices via a network 120. The content delivery system 100 also contains a versioned content management server system 112 connected to the content display devices and the content delivery server system 110 via the network 120. In several embodiments, an unmanaged content source 114 is configured to provide unmanaged content via the network 120 to the content delivery server system 110 and/or the content display devices in response to requests for unmanaged content referenced in managed content retrieved from the versioned content management server system 112. In many embodiments, the network 120 is the Internet and/or a local area network. In several embodiments, the content delivery server system 110, the unmanaged content source 114, and/or the versioned content management server system 112 are implemented using a single server. In a number of embodiments, the content delivery server system 110 the unmanaged content source 114, and/or the versioned content management server system 112 are implemented using a plurality of servers. In many embodiments, the versioned content management server system 112 is configured to provide unmanaged content. Content display devices include, but are not limited to, laptop computers 130, personal computers 132, cellular telephones 134, and tablet devices 136.

Figure 1:
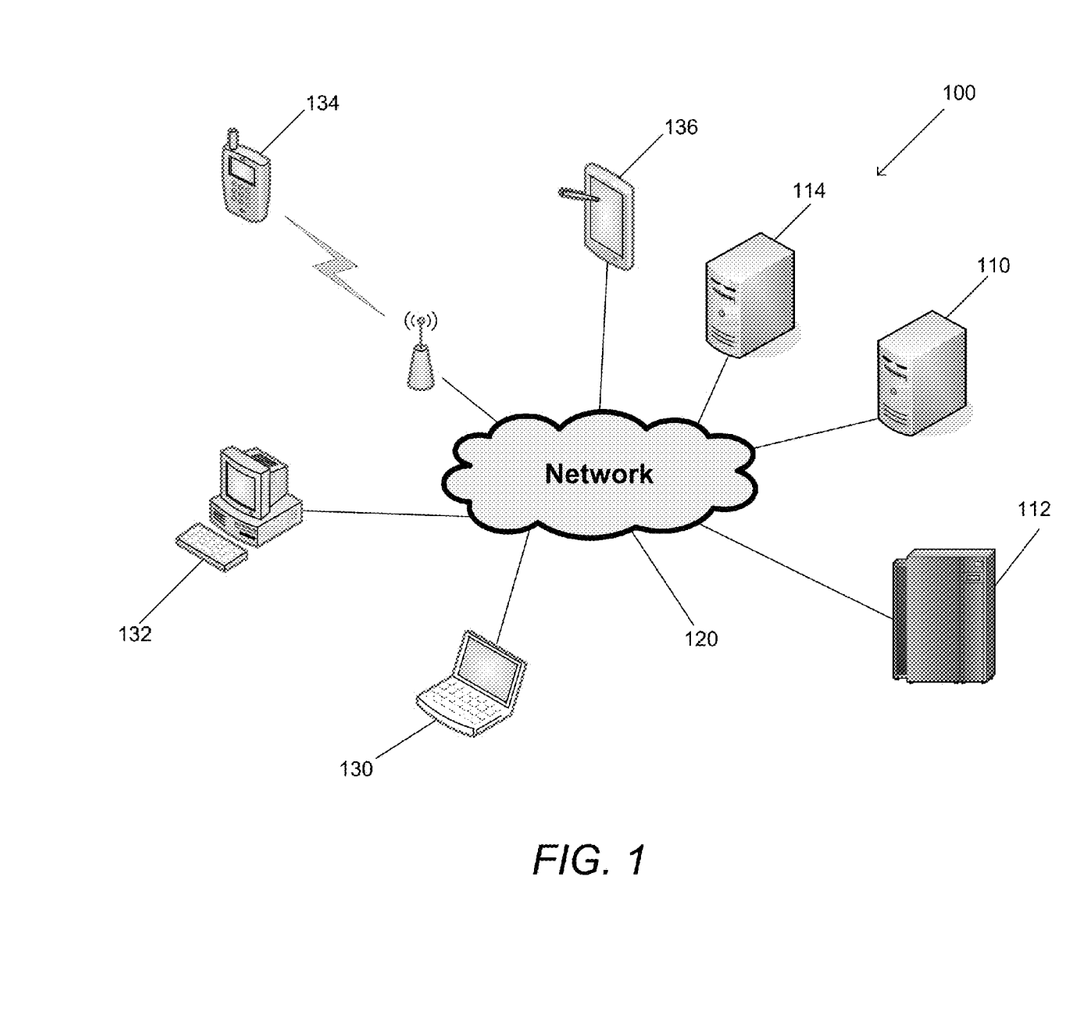
FIG. 1 conceptually illustrates a content delivery system including a versioned content management server system in accordance with an embodiment of the invention.

In a variety of embodiments, the content display devices are configured to request content from the versioned content management server system 112. The versioned content management server system 112 is configured to identify at least one version of the managed content stored using the versioned content management server system 112 and transmit the identified content to the requesting content display device. Processes for identifying versions of managed content in response to requests for content are discussed in detail below. In many embodiments, content display devices are configured to request one or more pieces of unmanaged content from the unmanaged content source 114, the versioned content management server system 112, and/or the content delivery server system 110 and generate one or more pieces of content using content received in response to the requests. In a number of embodiments, the content delivery server system 110 is configured to receive managed content from the versioned content management server system 112 and/or unmanaged content from an unmanaged content source 114 and combine the received pieces of content into one or more pieces of merged content. The content delivery server system 110 is further configured to transmit at least one piece of the generated content in response to requests for content from content display devices. In several embodiments, the content delivery server system 110, the versioned content management server system 112, and/or the unmanaged content source 114 is configured to customize the content transmitted in response to the request for content based upon the capabilities of the requesting device, the location of the requesting device, the time the request for content was made (and/or processed), the content being provided, and/or other content that has been previously provided. Capabilities of a content display device and/or a content delivery server system include, but are not limited to, the resolution of the display associated with the device, the web browser or other content display application utilized to display the content, the processing capabilities of the device, the input device(s) connected to the device, the data format expected by the device, and/or differences in the manner in which data is stored between the versioned content management server system 112 and the requesting device. Any capabilities of content display devices and/or content delivery server systems not specifically described above can be utilized as appropriate to the requirements of specific applications in accordance with embodiments of the invention.

Although a specific content delivery system is conceptually illustrated in FIG. 1, alternative architectures, including those with devices in peer-to-peer communication, can also be utilized in accordance with embodiments of the invention. Systems and methods for receiving, storing, and transmitting managed content in accordance with embodiments of the invention are discussed below.

Versioned Content Management Server Systems

Figure 2:
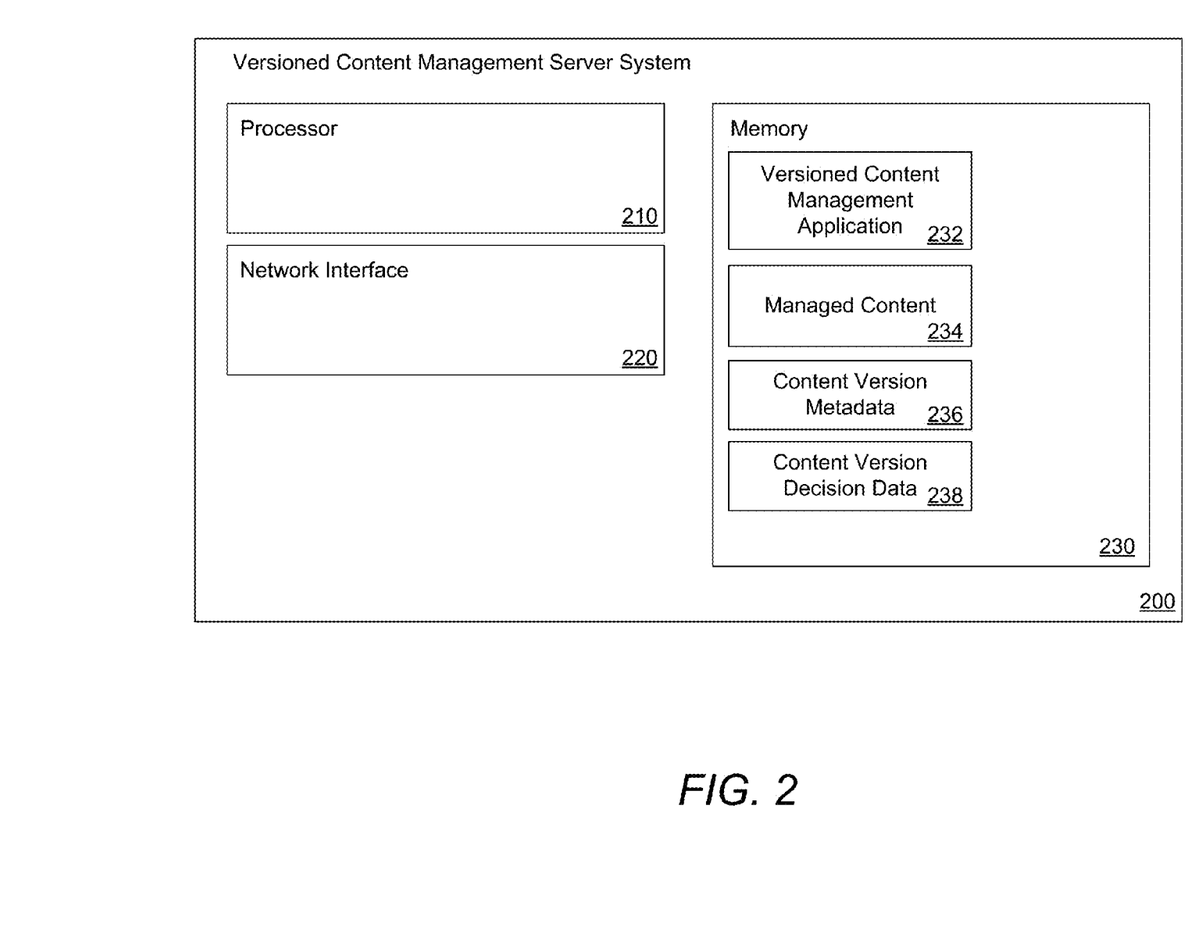
FIG. 2 is a conceptual illustration of a versioned content management server system in accordance with an embodiment of the invention.

Versioned content management server systems in accordance with embodiments of the invention are configured to receive, store, and manage content and transmit one or more versions of the managed content in response to requests for content. A conceptual illustration of a versioned content management server system in accordance with an embodiment of the invention is shown in FIG. 2. The versioned content management server system 200 includes a processor 210 in communication with memory 230. The versioned content management server system 200 also includes a network interface 220 configured to send and receive data over a network connection. In a number of embodiments, the network interface 220 is in communication with the processor 210 and/or the memory 230. In several embodiments, the memory 230 is any form of storage configured to store a variety of data, including, but not limited to, a versioned content management application 232, managed content 234, content version metadata 236, and content version decision data 238. The network interface 220 is configured to receive managed content 234, content version metadata 236, and content version decision data 238 via a network (such as the Internet) using network interface 220 and provide the received data to the processor 210 and/or the memory 230. In many embodiments, the versioned content management application 232, the managed content 234, the content version metadata 236, and/or content version decision data 238 are stored using an external server system and received by the content display device 200 using the network interface 220.

The versioned content management application 232 configures the processor 210 to receive requests for managed content 234 and transmit one or more versions of the managed content 234 based on the received request and the content version metadata 236 using the network interface 220. Requesting devices include, but are not limited to, content delivery server systems and content display devices. In several embodiments, the versioned content management application 232 configures the processor 210 to locate one or more pieces of managed content 234 satisfying the received request for content. In many embodiments, the versioned content management application 232 configures the processor 210 to generate one or more versions of the managed content 234 using the content version metadata 236 and/or the content version decision data 238 to satisfy the received request for content. In a number of embodiments, the versioned content management application 232 configures the processor 210 to customize the located and/or generated content based on the capabilities of the requesting device and/or content version decision data 238.

In many embodiments, content version decision data 238 includes a variety of conditions indicating the version (or versions) of managed content 234 to provide in response to a request for content. In a variety of embodiments, conditions include one or more dates and/or times to provide one or more versions of managed content 234 and/or the number of times one or more versions of managed content 234 should be provided. Other conditions and/or decisions regarding the delivery of various versions of managed content 234 can be utilized to determine particular versions of the managed content 234 to be provided in response to a request for content as appropriate to the requirements of specific applications in accordance with embodiments of the invention. In a number of embodiments, the versioned content management application 232 configures the processor 210 to receive additional content, identify managed content 234 corresponding to the additional content, generate content version metadata 236 describing the differences between the additional content and the identified managed content 234, and store the additional data and/or the generated content metadata 236. In many embodiments, the versioned content management application 232 configures the processor 210 to receive input data and utilize the received input data in the generation and/or modification of content version metadata 236. In a number of embodiments, the versioned content management application 232 configures the processor 210 to receive performance data with respect to the managed content 234 and update the content version metadata 236 based on the received performance data. In several embodiments, the received performance data is related to tracked interactions with the managed content including, but not limited to, mouse movements, mouse clicks, key presses, touch interactions, swipe interactions, rotation interactions, and voice input. Other performance data and interactions used to determine performance data can be utilized as appropriate to the requirements of specific applications in accordance with embodiments of the invention.

In many embodiments, the versioned content management application 232 configures the processor 210 to transmit and/or receive managed content 234, content version metadata 236, and/or content version decision data 238 utilizing the hypertext transfer protocol (HTTP) and/or a secured version of HTTP, such as HTTP Secure. HTTP is defined in RFC 2616, published by the Internet Engineering Task Force (IETF). In a number of embodiments, the versioned content management application 232 configures the processor 210 to receive and/or transmit managed content 234, content version metadata 236, and/or content version decision data 238 via the File Transfer Protocol (FTP) and/or a secured version of FTP, such as FTP Secure. FTP is defined in RFC 959, along with several extensions in RFC 2228 and RFC 2428, published by the IETF. RFCs 959, 2228, 2428, and 2616 are hereby incorporated by reference in their entirety. In other embodiments, any of a variety of stateless and/or stateful data transfer protocols can be utilized to transmit and/or receive content as appropriate to the requirements of specific applications in accordance with embodiments of the invention.

Although a specific architecture for a versioned content management server system in accordance with an embodiment of the invention is conceptually illustrated in FIG. 2, any of a variety of architectures, including those which store data or applications on disk or some other form of storage and are loaded into memory 230 at runtime and systems that are distributed across multiple physical servers, can also be utilized in accordance with embodiments of the invention. Methods for receiving, storing, and transmitting managed content in accordance with embodiments of the invention are discussed below.

Providing Managed Content

Figure 3:
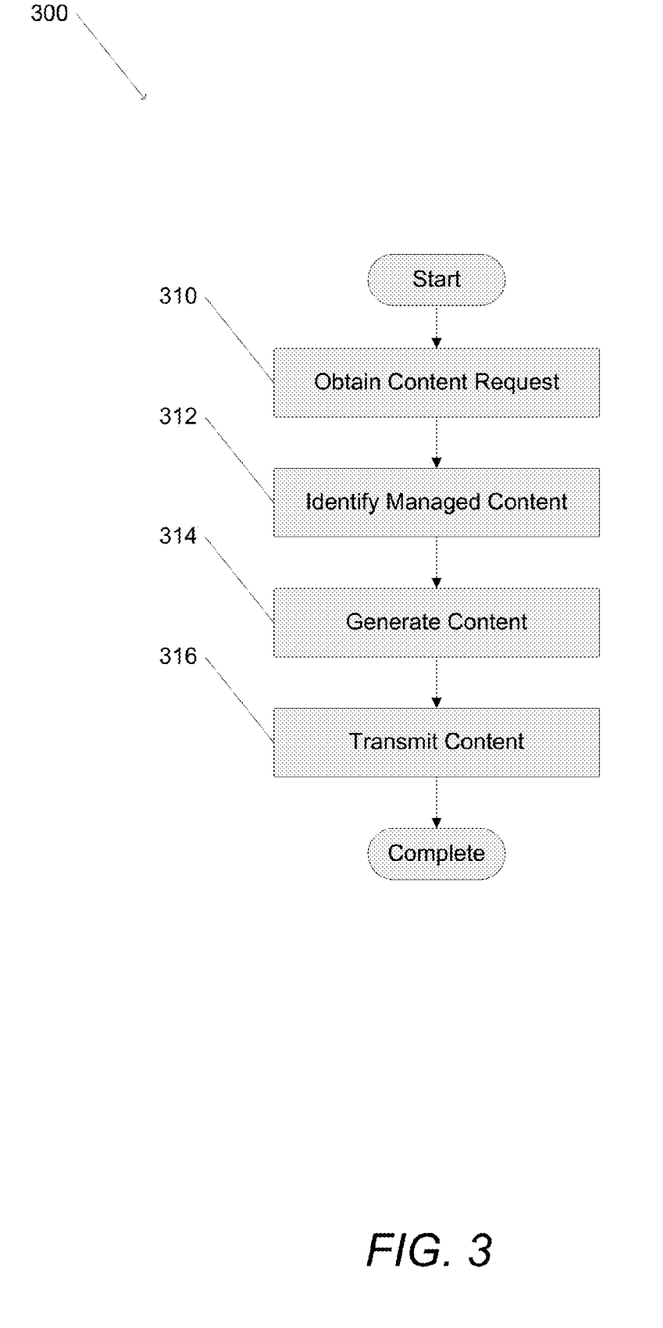
FIG. 3 is a flow chart illustrating a process for identifying and transmitting managed content in accordance with an embodiment of the invention.

By utilizing managed content and associated content version metadata, versioned content management server systems in accordance with embodiments of the invention are capable of hosting and transmitting multiple versions of the managed content in response to different requests for content. This allows versioned content management server systems to host both a variety of different pieces of managed content and multiple versions of each piece of managed content simultaneously. A process for identifying and transmitting managed content in accordance with an embodiment of the invention is illustrated in FIG. 3. The process 300 includes receiving (310) a content request. Managed content is identified (312). Content is generated (314) and transmitted (316).

In many embodiments, a content request is obtained (310) from a content display device configured to display content and/or a content display server system configured to retrieve content and provide the retrieved content to content display devices. In a number of embodiments, the obtained (310) content request identifies (312) the managed content and/or the desired version of the managed content. In several embodiments, identifying (312) managed content includes utilizing content version decision data along with the obtained (310) content request. In a number of embodiments, identifying (312) managed content is based on performance data associated with the managed content. Content can be transmitted (316) via any number of protocols and/or techniques as described above.

In a variety of embodiments, generating (314) content includes identifying (312) one or more pieces of managed content and utilizing those pieces of managed content. Identifying (312) the pieces of managed content can be based on content version metadata associated with the managed content. In many embodiments, generating (314) content includes merging a piece of managed content with one or more content changes described in content version metadata associated with the piece of managed content. Processes for merging pieces of content to generate (314) content are described further below.

Although a specific process for providing managed content is described above with respect to FIG. 3, any number of processes for providing managed content can be utilized in accordance with embodiments of the invention. Processes for receiving, storing, and presenting alternative versions of managed content in accordance with embodiments of the invention are discussed below.

Obtaining and Storing Managed Content

Figure 4:
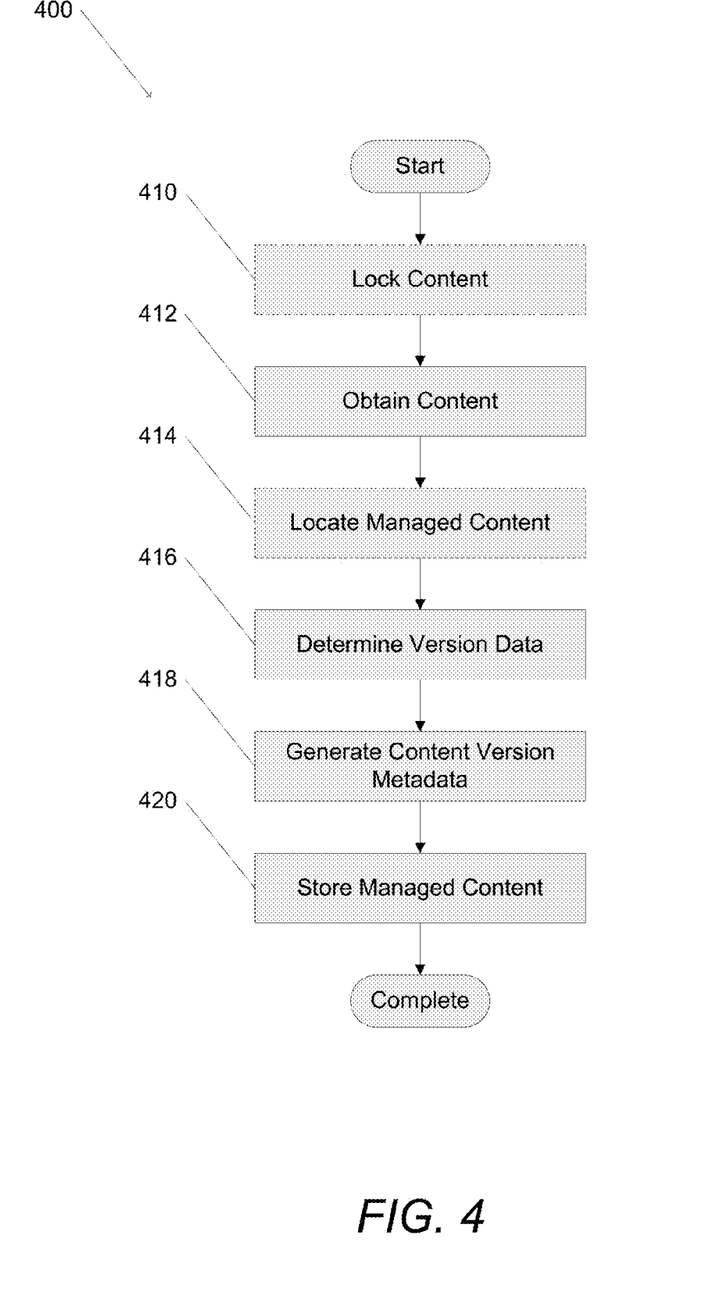
FIG. 4 is a flow chart illustrating a process for receiving and storing managed content in accordance with an embodiment of the invention.

When hosting content, it is often desirable to store a variety of versions of the content. By storing a variety of versions, different presentations and/or revisions of the content can be transmitted in response to requests for the content. Additionally, if any of the revisions of the content are defective, requests for the defective content can easily be redirected towards a non-defective revision of the content in real time. Versioned content management server systems in accordance with embodiments of the invention are configured to host a variety of versions of managed content and transmit versions of the hosted content in response to requests for content. A process for storing managed content in accordance with embodiments of the invention is illustrated in FIG. 4. In a variety of embodiments, content is locked (410). Content is obtained (412). In several embodiments, managed content is located (414). Version information is identified (416). Content version metadata is generated (418). Managed content is stored (420).

In several embodiments, locked (410) content is associated with one or more pieces of author data, where the author data indicates a user and/or device authorized to modify the content. In a variety of embodiments, obtained (412) content includes obtained content version metadata describing versioning information regarding a piece of managed content. In a number of embodiments, obtained (412) content does not have any corresponding managed content. In many embodiments, managed content is located (414) using the obtained content version metadata associated with the obtained (412) content. In a variety of embodiments, managed content is located (414) by manually identifying a piece of managed content selected from one or more pieces of managed content identified as being similar to the obtained (412) content.

In many embodiments, version data is determined (416) based on the obtained content version metadata and/or differences between the obtained (412) content and the located (414) managed content. In several embodiments, content version metadata is generated (418) by manually merging conflicts between the obtained (412) content and the located (414) managed content. Conflicts can be automatically merged utilizing a variety of techniques, such as three-way merges, recursive three-way merges, fuzzy patching, weave merging, and rebasing, in accordance with embodiments of the invention. In a number of embodiments, the managed content and the content changes can be arranged in a hierarchical relationship and generating (314) content includes merging content changes with the managed content, where the generated (314) content utilizes the content changes having the managed content as a common ancestor in the hierarchical relationship. Other techniques, including those utilizing non-hierarchical relationships between pieces of content, such as directed acyclic graphs and ontologies, can be utilized as appropriate to the requirements of specific applications in accordance with embodiments of the invention.

In several embodiments, the content version metadata generated (418) includes performance data taken from the located (414) managed content. In a number of embodiments, the generated (418) content version metadata includes the determined (416) version data, the author data, the obtained content version metadata, and/or time information. Other data including, but not limited to, branch data, label data, check in/check out data, and merge data, can be included in the content version metadata as appropriate to the requirements of specific applications in accordance with embodiments of the invention. In a variety of embodiments, storing (420) managed content includes storing the generated (418) content version metadata and associating the content version metadata with the located (414) managed content using a hierarchical relationship and/or a graph-based relationship structure. In a variety of embodiments, storing (420) managed content includes unlocking the locked (410) content. Content can be unlocked by modifying the content version metadata associated with the locked (410) content.

A specific process for obtaining and storing managed content is described above with respect to FIG. 4; however, any number of processes for receiving and storing versioned content can be utilized in accordance with embodiments of the invention. Methods for presenting alternative versions of managed content and tracking the performance of managed content are discussed below.

Presenting Alternative Versions of Managed Content

Figure 5:
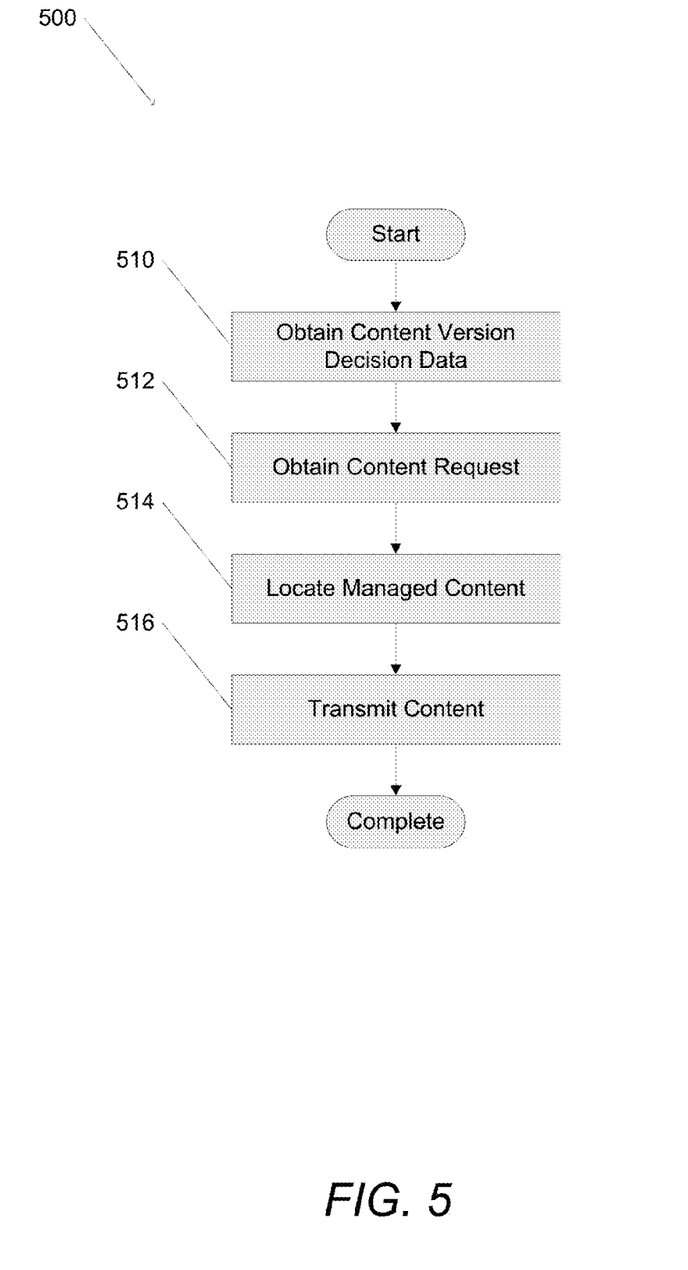
FIG. 5 is a flow chart illustrating a process for presenting alternative versions of managed content in accordance with an embodiment of the invention.

Content developers often wish to present particular versions of content on particular days and/or test multiple versions of content in order to measure the relative effectiveness of the various versions of content. Versioned content management server systems in accordance with embodiments of the invention are configured to dynamically provide different versions of managed content based on one or more decision factors. A process for dynamically presenting alternative versions of managed content in accordance with embodiments of the invention is illustrated in FIG. 5. The process 500 includes obtaining (510) content version decision data. A content request is obtained (512). Managed content is located (514) and transmitted (516).

In a number of embodiments, the obtained (510) content version decision data includes one or more decision factors. Decision factors that can be utilized include the time of a content request, the number of times a particular version of one or more pieces of managed content are provided, the version or versions of the managed content to be transmitted, performance data associated with one or more versions of the managed content, and the device and/or user associated with a content request. Other decision factors can be utilized as appropriate to the requirements of specific applications in accordance with embodiments of the invention. In many embodiments, a content request is obtained (512) and/or managed content is located (514) utilizing processes similar to those described above. In several embodiments, the obtained (512) content request includes the time the request was made, the capabilities of the device providing the content request, and/or user data associated with the content request; other information can be included in the content request as appropriate to the requirements of specific applications in accordance with embodiments of the invention. In a number of embodiments, managed content is located (514) based on the obtained (510) content version decision data and the obtained (512) content request. In a variety of embodiments, the transmitted (516) content is a version of the located (514) managed content generated utilizing processes similar to those described above. In several embodiments, the transmitted (516) content is the located (514) managed content.

By way of example, by basing the version of the managed content to provide on the time of the request for content, a version of the located (514) managed content can be developed for events on particular days and times (such as holidays and other noteworthy events) in advance of the event and automatically presented in response to obtained (512) content requests on those identified days and times without taking any additional action. When the indicated time and/or event has ended, the original version of the content (or a newer version) is automatically transmitted (520) in response to obtained (512) content requests without any additional work necessary to either update the managed content or roll the managed content back to a previous version. As a second example, multiple variants for the same piece of managed content can be created in order to test the relative performance of the variants of the managed content. The obtained (510) content version decision data indicates the variants of the managed content to present and the desired criteria to transmit (516) a particular version of the located (514) managed content. In several embodiments, the criteria can include (but are not limited to) presenting certain versions of the located (514) managed content based on geolocation data indicating the location of the device from which the content request was obtained (512), the time at which the content request was obtained (512), and/or the number of times each version of the managed content has been transmitted (520). In this way, the obtained (510) content version decision data can be utilized to perform comparison testing of multiple versions of located (514) managed content, geographic-based targeting of content, and/or time-based targeting of content.

Although a specific process for presenting alternative versions of managed content is described above with respect to FIG. 5, any number of processes can be utilized in accordance with embodiments of the invention. Methods for associating performance information with versions of managed content in accordance with embodiments of the invention are discussed below.

Tracking Managed Content Performance

Figure 6:
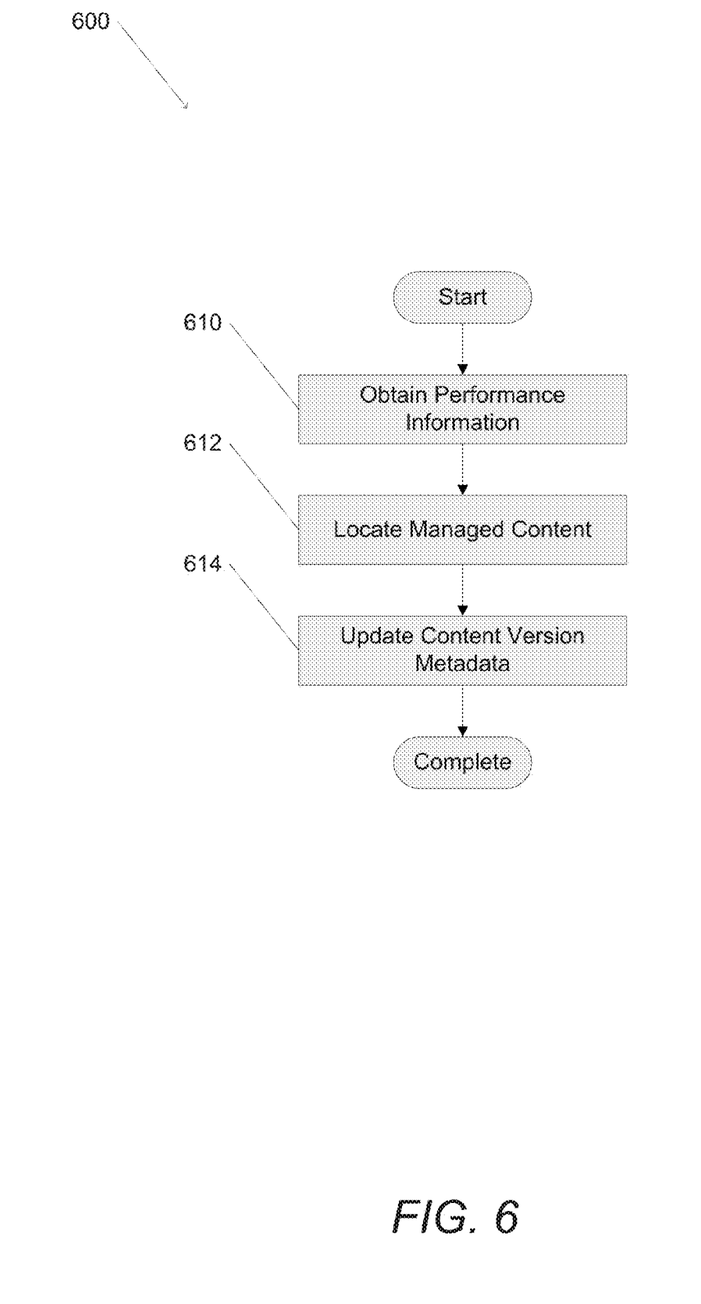
FIG. 6 is a flow chart illustrating a process for tracking the performance of managed content in accordance with an embodiment of the invention.

It is often useful to track the performance of various versions of managed content. The tracked performance data can be associated with the appropriate versions of the managed content and used to identify those versions that perform well and/or poorly. Versioned content management server systems in accordance with embodiments of the invention are configured to receive and store performance data associated with various versions of managed content. A process for associating performance information with one or more versions of managed content in accordance with embodiments of the invention is illustrated in FIG. 6. The process 600 includes obtaining (610) performance information. Managed content is located (612) and content version metadata is updated (614).

In a variety of embodiments, performance information is obtained (610) from content delivery server systems providing content to content display devices. In many embodiments, performance information is obtained (610) from a client display device. In several embodiments, the performance information is obtained (610) based on comparison testing of versions of managed content utilizing processes similar to those described above. In a number of embodiments, the performance information contains engagement data. Systems and methods for determining performance information for content that can be utilized in accordance with embodiments of the invention are disclosed in U.S. patent application Ser. No. 13/792,855, titled "Systems and Methods for Categorizing and Measuring Engagement with Content" and filed Mar. 11, 2013, the disclosure of which is hereby incorporated by reference in its entirety. In several embodiments, locating (612) managed content utilizes the obtained (610) performance information to identify the managed content and/or a version of the managed content. In a variety of embodiments, updating (614) the content version metadata includes associating the obtained (610) performance information with the located (612) managed content and/or one or more pieces of content version metadata associated with the located (612) managed content.

A specific process for tracking the performance of different versions of managed content is described above with respect to FIG. 6; however, any number of processes can be utilized in accordance with embodiments of the invention.

Although the present invention has been described in certain specific aspects, many additional modifications and variations would be apparent to those skilled in the art. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A versioned content management server system, comprising:
   a processor;
   a memory connected to the processor and configured to store a versioned content management application; and
   content storage configured to store managed content;
   wherein managed content comprises content and content version metadata associated with the content; and
   wherein the versioned content management application configures the processor to:
   receive updated content, where the updated content is associated with author data;
   locate managed content stored in the content storage device based on the received updated content;
   determine version data based on a portion of the located managed content, the received updated content, and the author data;
   update the content version metadata data based on the updated content and the version data;
   associate the updated version content data with the managed content;
   receive a request for content, where the request for content comprises a requested content version and requesting device capabilities;
   identify a portion of the managed content that corresponds to the requested content version and requesting device capabilities;
   retrieve the identified portion of the managed content; and
   transmit the retrieved portion of the managed content.

2. The system of claim 1, wherein the versioned content management application further configures the processor to transmit the retrieved portion of the managed content to a content display device, where the content display device is configured to display the transmitted content.

3. The system of claim 2, wherein the content display device is configured to:
   determine performance data based on the received content; and
   transmit the determined performance data to the versioned content management server system.

4. The system of claim 3, wherein the versioned content management application further configures the processor to:
   receive performance data related to the identified portion of the managed content; and
   include the performance data with the content version metadata associated with the identified portion of the managed content.

5. The system of claim 1, wherein the versioned content metadata includes performance data related to interactions with the portion of the managed content associated with the versioned content metadata.

6. The system of claim 5, wherein the versioned content management application further configures the processor to identify the portion of the managed content corresponding to the requested content based on the performance data.

7. The system of claim 1, wherein:
   the managed content comprises a first portion of content and a second portion of content, where the first portion of content and the second portion of content are related via a hierarchical relationship; and
   wherein the versioned content management application further configures the processor to:
   identify changes between the obtained content, the first portion of content, and the second portion of content;
   generate content version metadata using the identified changes; and
   generate the obtained content using the content version metadata and the first portion of content.

8. The system of claim 1, wherein the versioned content management application further configures the processor to:
   obtain unmanaged content;
   incorporate the unmanaged content into the retrieved portion of the managed content to create merged content; and
   transmit the merged content.

9. The system of claim 1, wherein the versioned content management application further configures the processor to transmit the retrieved portion of the managed content to a content delivery server system, where the content delivery server system is configured to:
   receive content from at least one versioned content management server system;
   receive delivery requests for content; and
   transmit content in response to the received delivery requests.

10. The system of claim 9, wherein the content delivery server system is configured to:
   identify one or more references to unmanaged content in the received content;
   request unmanaged content based on the references to unmanaged content;
   receive unmanaged content from at least one unmanaged content source; and update the content to incorporate the referenced unmanaged content.

11. A method for managing versioned content, comprising:
receiving updated content using a versioned content management server system, where the updated content is associated with author data;
locating managed content stored in the versioned content management server system based on the received updated content using the versioned content management server system;
determining version data based on a portion of the located managed content, the received updated content, and the author data using the versioned content management server system;
updating the content version metadata data based on the updated content and the version data using the versioned content management server system;
associating the updated version content data with the managed content using the versioned content management server system;
receiving a request for content using the versioned content management server system, where the request for content comprises a requested content version and requesting device capabilities;
identifying a portion of the managed content that corresponds to the requested content version and requesting device capabilities using the versioned content management server system;
retrieving the identified portion of the managed content using the versioned content management server system; and
transmitting the retrieved portion of the managed content using the versioned content management server system.

12. The method of claim 11, further comprising transmitting the retrieved portion of the managed content to a content display device using the versioned content management server system, where the content display device is configured to display the transmitted content.

13. The method of claim 12, wherein the content display device is configured to:
determine performance data based on the received content; and
transmit the determined performance data to the versioned content management server system.

14. The method of claim 13, further comprising:
receiving performance data related to the identified portion of the managed content using the versioned content management server system; and
including the performance data with the content version metadata associated with the identified portion of the managed content using the versioned content management server system.

15. The method of claim 11, wherein the versioned content metadata includes performance data related to interactions with the portion of the managed content associated with the versioned content metadata.

16. The method of claim 15, further comprising identifying the portion of the managed content corresponding to the requested content based on the performance data using the versioned content management server system.

17. The method of claim 11, further comprising:
identifying changes between the obtained content, a first portion of content, and a second portion of content using the versioned content management server system, where the managed content comprises the first portion of content and the second portion of content, where the first portion of content and the second portion of content are related via a hierarchical relationship;
generating content version metadata based on the identified changes using the versioned content management server system; and
generating the obtained content based on the content version metadata and the first portion of content using the versioned content management server system.

18. The method of claim 11, further comprising:
obtaining unmanaged content using the versioned content management server system;
incorporating the unmanaged content into the retrieved portion of the managed content to create merged content using the versioned content management server system; and
transmitting the merged content using the versioned content management server system.

19. The method of claim 11, further comprising transmitting the retrieved portion of the managed content to a content delivery server system using the versioned content management server system, where the content delivery server system is configured to:
receive content from at least one versioned content management server system;
receive delivery requests for content; and
transmit content in response to the received delivery requests.

20. The method of claim 19, wherein the content delivery server system is configured to:
identify one or more references to unmanaged content in the received content;
request unmanaged content based on the references to unmanaged content;
receive unmanaged content from at least one unmanaged content source; and
update the content to incorporate the referenced unmanaged content.

* * * * *